United States Patent [19]

Songer

[11] 3,963,865

[45] June 15, 1976

[54] ANTI-PIRACY METHOD AND SYSTEM

[75] Inventor: Jimmie D. Songer, Hollywood, Calif.

[73] Assignee: Trans-American Video, Inc., Hollywood, Calif.

[22] Filed: June 4, 1975

[21] Appl. No.: 583,649

[52] U.S. Cl. .............................. 178/7.1; 178/5.1; 178/69.5 TV; 360/37; 179/1.5 E
[51] Int. Cl.² .................... H04N 3/16; H04N 1/44; H04M 1/70; H04N 5/78
[58] Field of Search ......... 178/5.1, 22, 37, 69.5 TV, 178/69.5 G, DIG. 35, DIG. 26, DIG. 23; 325/32, 122; 179/1.5 R, 1.5 E; 360/37; 343/179; 358/4, 8, 17, 9, 12

[56] References Cited
UNITED STATES PATENTS

| | | | |
|---|---|---|---|
| 3,180,929 | 4/1965 | Hibbard et al. | 360/37 |
| 3,335,218 | 8/1967 | Johnson | 360/37 |
| 3,460,161 | 8/1969 | Waller et al. | 178/5.1 |
| 3,530,232 | 9/1970 | Reiter et al. | 178/5.1 |
| 3,717,206 | 2/1973 | Zopf et al. | 178/5.1 |
| 3,837,003 | 9/1974 | Justice | 360/18 |

Primary Examiner—Benedict V. Safourek
Assistant Examiner—R. John Godfrey
Attorney, Agent, or Firm—Lyon & Lyon

[57] ABSTRACT

There is disclosed herein a method and system for eliminating or deterring the unauthorized duplication or piracy of video program material, including video tape, cable and broadcast television material. A composite video signal is encoded when recording, or upon broadcast by wire or cable, for preventing unauthorized duplication of the video material and without the need for scramblers and unscramblers. The encoding method allows normal playback of the video material on a conventional television receiver or monitor, but prevents the video material from being effectively re-recorded or duplicated on any of a number of commercially available video recorders by eliminating or distorting the video image upon playback of the re-recording to thereby destroy its commercial value. No decoder or unscrambler is required at the television receiver or monitor for normal playback of the encoded video signals. The method and system involve changing the vertical interval of the video signal prior to recording or transmission. In a preferred form, a displacement is introduced in the NTSC vertical synchronizing interval in the area of the vertical serrates at a point therein which allows sufficient pulse information for integration in the operation of normal television receiver vertical circuitry, but insufficient pulse information for operation of vertical circuits of various formats of video tape recorders.

23 Claims, 19 Drawing Figures

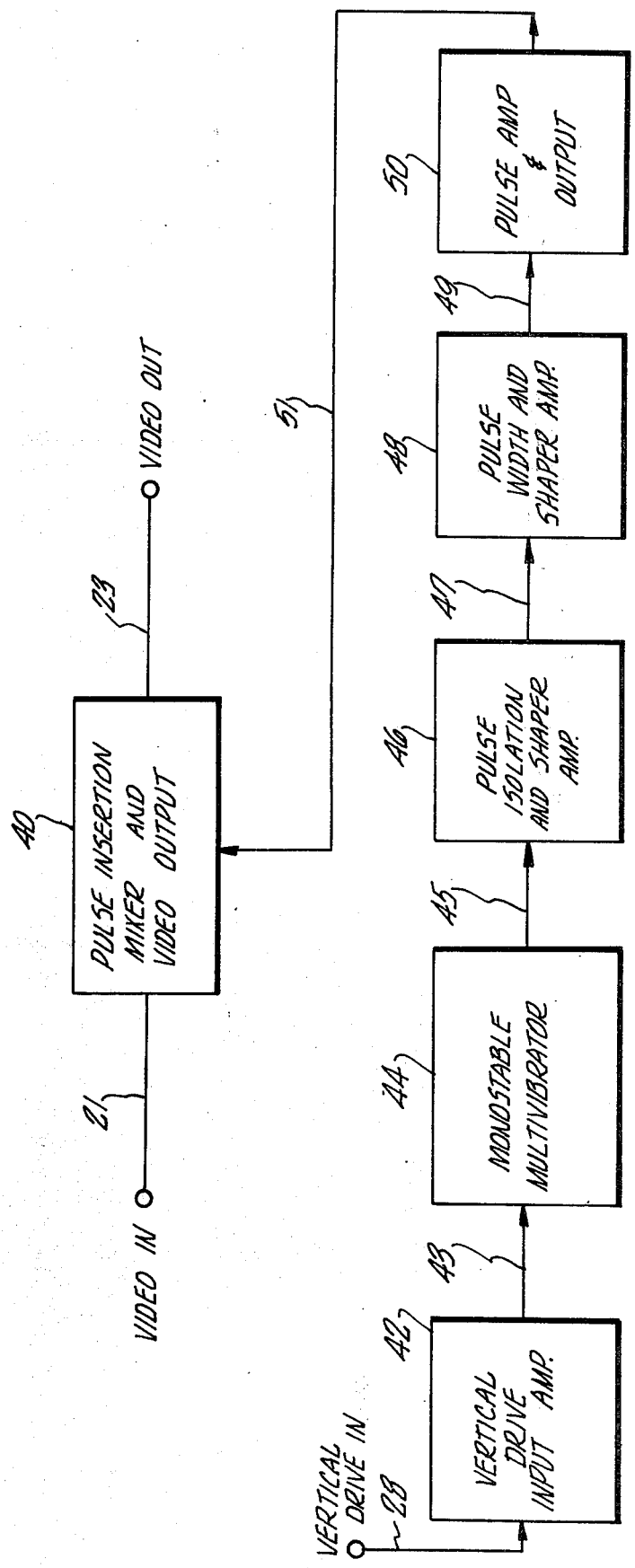

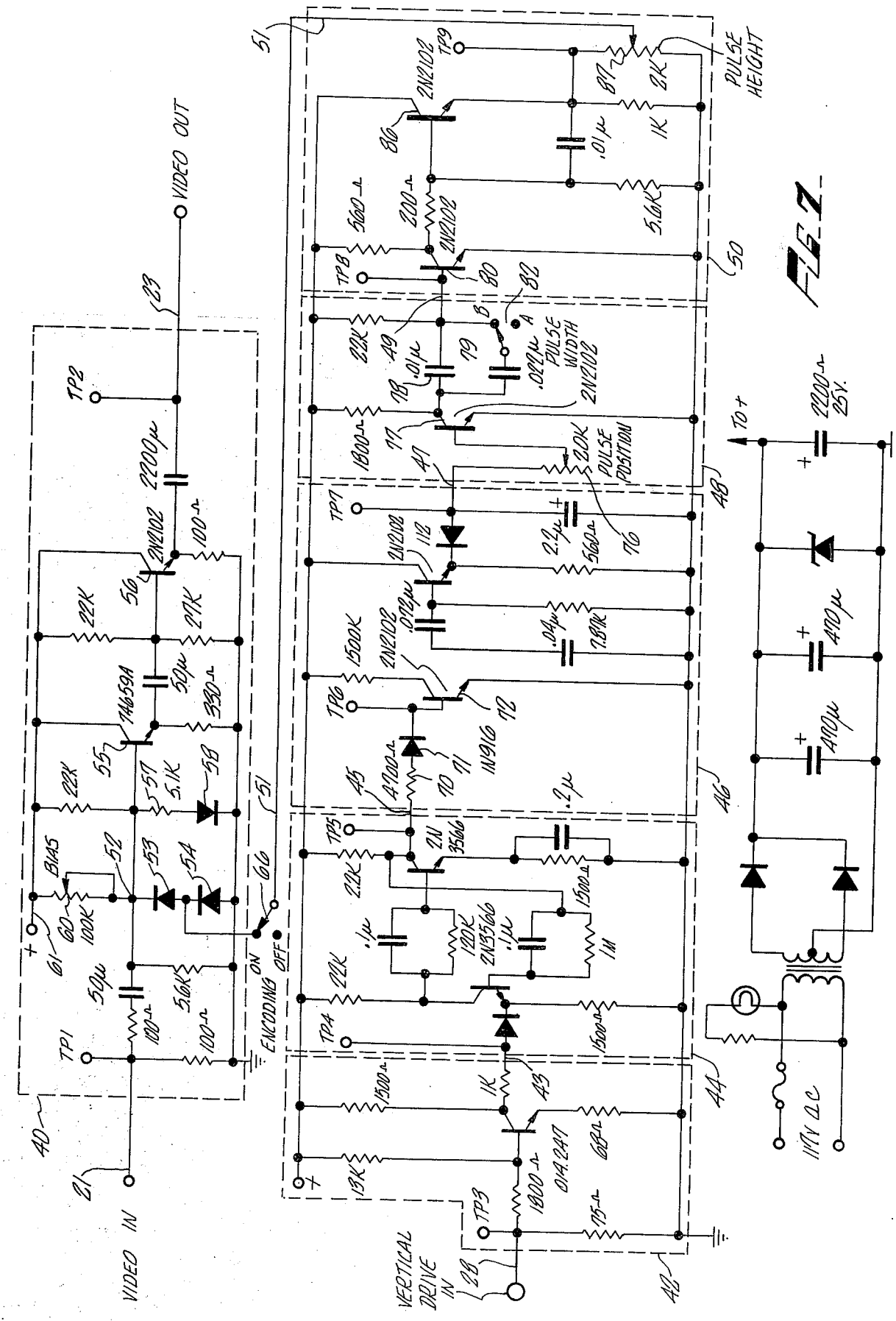

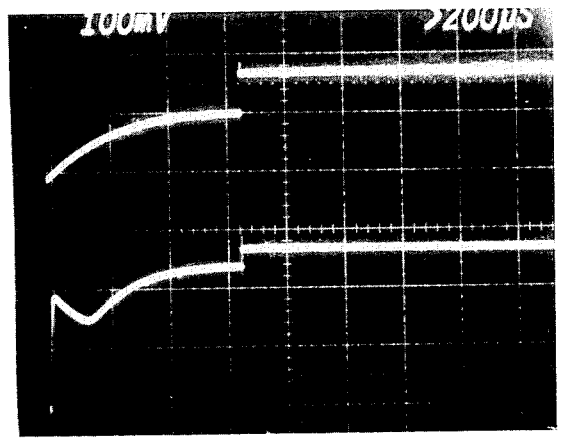
FIG_8c_
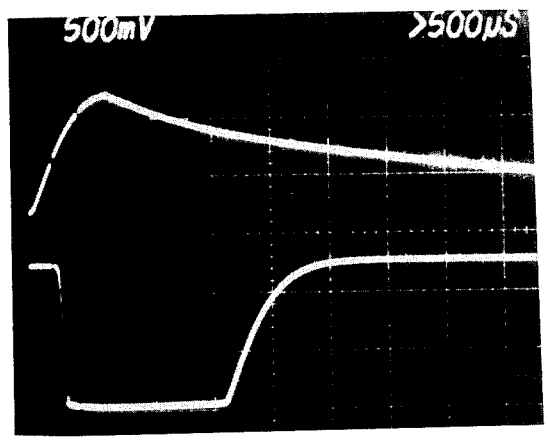
FIG_8D_
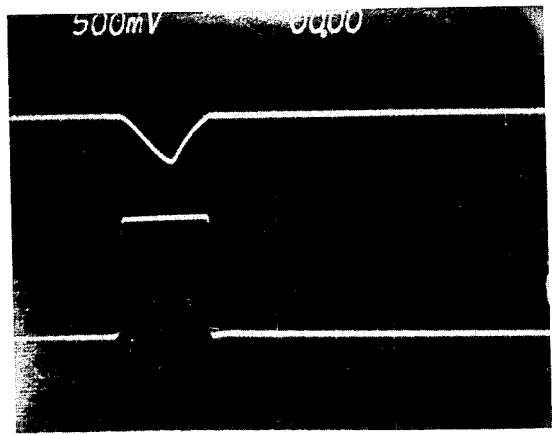
FIG_8E_

ANTI-PIRACY METHOD AND SYSTEM

The present invention relates to the field of television, and more particularly to a method, or process, and a system for encoding video signals to allow normal playback on conventional television receiver or monitor, but for preventing the video signals from being effectively re-recorded by eliminating or distorting the video image upon playback of such re-recording or copy.

Various methods and systems have been devised for preventing the reception or duplication of video signals; however, the same have required an encoder, or scrambler, for initially encoding the video signals at the source, as well as an unscrambler, or decoder, for decoding the video signals for playback. For example, numerous subscription television systems have been devised wherein some type of encoding system is used at the point of broadcast, and a complementary decoder is used at the television receiver for decoding the encoded signal to thereby allow normal playback of the program material. Numerous patents have been granted for such processes and systems, many being found in Class 178, Subclass 5.1. Although these processes and systems appear to be effective for their intended purpose of preventing reception of the encoded video signals unless a card is inserted into the decoder, a fee paid, and so forth, before reception is possible, they require some type of device to be associated with the television receiver.

With the advent of the introduction of relatively inexpensive video tape recorders, such as the types available to individuals for home use, unauthorized duplication of video program material has substantially increased. This unauthorized duplication, frequently referred to as videotape piracy, is engaged in both intentionally and unintentionally. It is estimated that the motion picture film and video tape industries may be losing substantial sums annually as a result of unauthorized video cassette copies of copyrighted feature motion pictures, films, and television programs, although the lost revenue is indeterminable because of the various forms of unauthorized duplication. In the educational market alone, the estimated losses are large, and this is but one segment of the broad non-theatrical market. A substantial portion of pirated material also is believed to be exported to other countries where it is distributed and sold, causing further revenue loss to legitimate businessmen. As can be appreciated, the use of prior encoding and decoding techniques which require a decoder at the point of reception are of no use in obviating this problem.

Accordingly, the present method and system is directed to an encoding method which effectively destroys the commercial quality of unauthorized re-recordings or copies of the originally encoded video material. No decoder is needed at the television receiver or monitor, and the encoding causes no loss of broadcast quality of the original material during playback on a television receiver or monitor. On the other hand, upon unauthorized re-recording of the encoded video material, many conventional video tape recorders function in a manner such that upon playback of the unauthorized copy on a receiver the video image is eliminated or substantially distorted.

The encoding method and system of the present invention is useful in producing original recordings, as well as in broadcast either over the air or by cable. The same can eliminate many of the program sources now available to a majority of those who improperly duplicate copyrighted program material. For example, the encoding of the present invention can significantly deter video piracy from CATV and Pay-CATV channels which presently provide sources of a great amount of program material. The method and system can also eliminate or reduce the increasing proliferation of private libraries built by the trading of pirated video cassette programs between individuals. This has become a threat to motion picture producers and exhibitors who lose, no matter how innocently, revenue that otherwise may be reflected in the box-office grosses of theatre-exhibited films. In the educational and industrial film markets producers of films frequently send preview or one-time rental copies of expensively-made training, educational, and documentary films to colleges, universities, and large industrial organizations where they often are copied and reused without any payment to the originator. Thus, the present method and system is useful in preventing the unauthorized duplication of original video program material on video tape and is useful in eliminating or reducing re-recordings of cable television program material, including that of closed circuit hotel and motel systems, as well as network and local television station broadcast programming.

The present method and system involves encoding of the video signal by the introduction of a change in the NTSC vertical interval in the area of the vertical serrates. The make-up of a conventional video signal is well known and includes the video picture information as well as various horizontal and vertical synchronizing signals. See, for example, page 794 of *Reference Data for Radio Engineers*, Fourth Edition, copyright 1956, published by International Telephone and Telegraph Corporation of New York, N.Y. The composite video signal includes a vertical interval comprising, in time, a number of vertical equalizing pulses or serrates, a vertical sync pulse of serrate interval, and a second vertical equalizing pulse or serrate interval. These signals are standard, well defined signals, and television receivers, monitors and video recorders are designed to be responsive to these signals in their operation.

Applicant has recognized that the response or tolerance of the vertical circuit in a television receiver or monitor is different from that of many conventional video tape recorders. For example, the vertical sync pulse interval includes six serrates. It has been found that normal television receivers and monitors will operate properly if approximately the first one and one half of these serrates are present in the composite video signal; whereas, the circuitry in many conventional video tape recorders requires more of these vertical serrates for proper operation. By leaving approximately the first one and one half serrates of the vertical sync pulse interval in a standard format and by changing or eliminating the remaining serrates of this interval, certain conventional video tape recorders (e.g., the Sony U-Matic video cassette machine) will not record a control track. With some other video tape recorders, in order to provide significant distortion of the image upon playback, a change is used in a larger portion of the vertical blanking interval.

In either case, the encoding process involves the introduction of a change in the vertical interval at a point which allows sufficient pulse information for integration in the operation of a normal receiver circuit but insufficient pulse information for operation of the vertical circuit of numerous formats of video tape machines.

In an exemplary embodiment of the concepts of the present invention, approximately 1½ serrates of the vertical sync pulse interval are left undisturbed. A displacement then is added to the second half of the second serrate and to the third through sixth serrates of the vertical sync pulse interval. In certain applications, in order to ensure sufficient image distortion upon playback of a re-recording, one or more of the serrates (1 through 6) of the second vertical equalizing pulse interval, and even one or two of the following horizontal blanking pulses also may be displaced. The process and system, thus, involves changing certain pulses in the vertical blanking period sufficiently so that the integrator circuit in the vertical circuit of a video tape recorder does not properly respond, while leaving sufficient vertical pulses or serrates for enabling proper operation of a normal television receiver or monitor.

The advantages and features of the present invention will become more apparent from the following description of embodiments thereof, taken in conjunction with the accompanying drawings, in which.

Figure 3A:
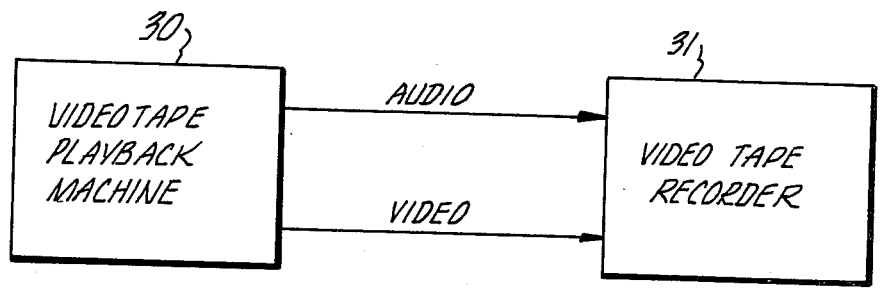
Figure 3B:
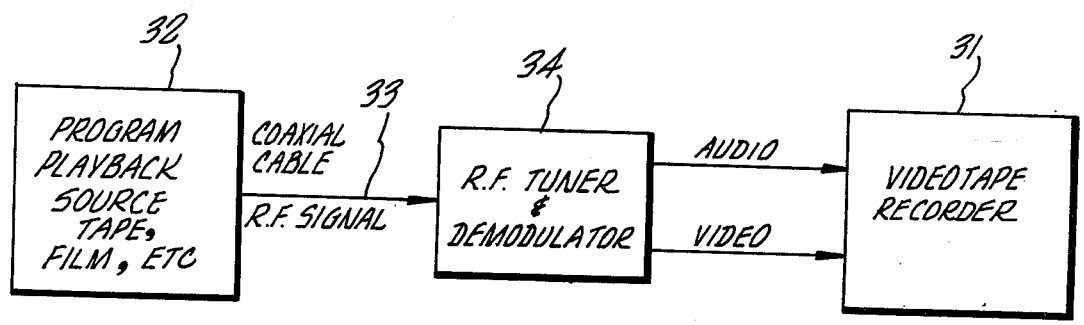
Figure 3C:
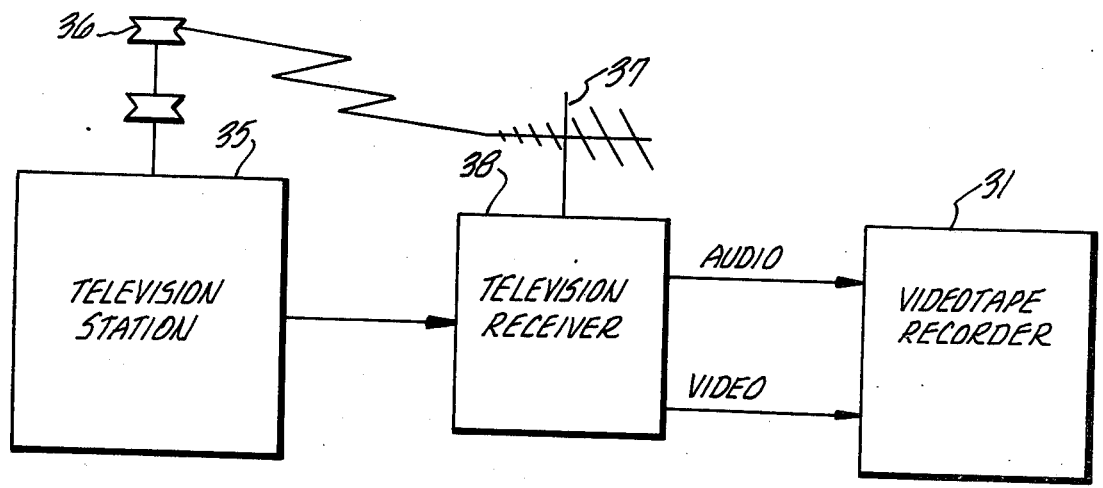
Figure 4A:
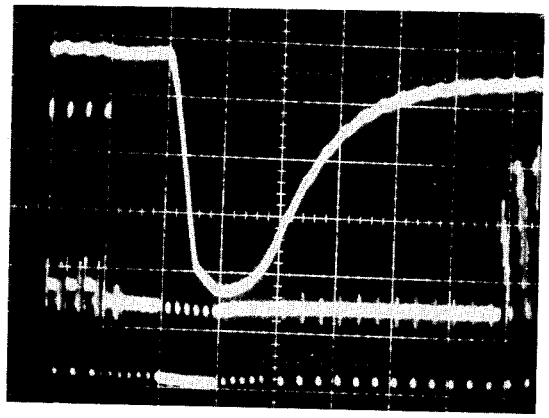
Figure 4B:
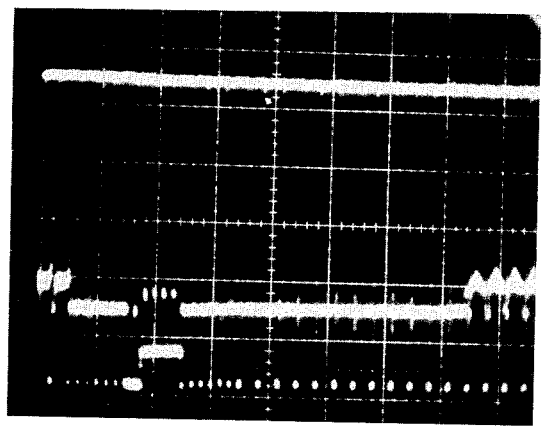
Figure 5A:
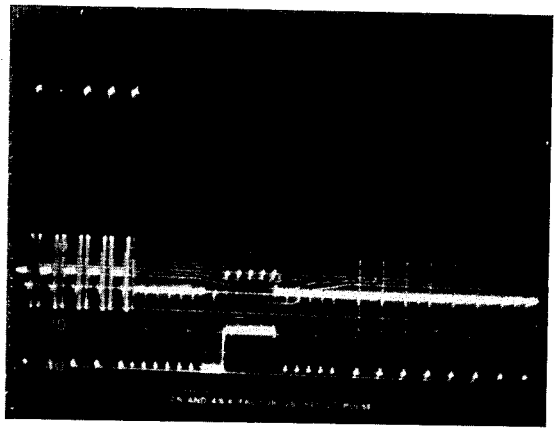
Figure 5B:
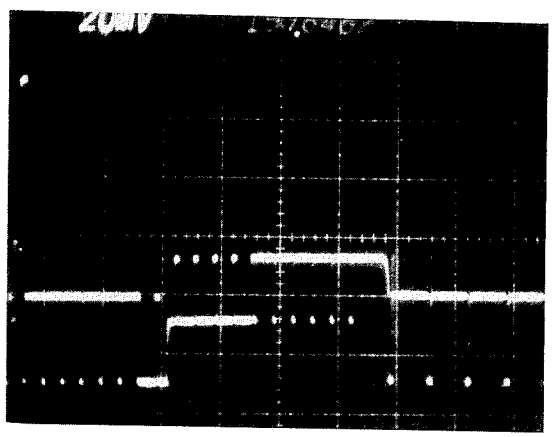

FIGS. 3a through 3c diagrammatically illustrate recording methods exemplary of those used in the unauthorized duplication of original video program material;

FIGS. 4a and 4b are photographic reproductions of exemplary waveforms illustrating respectively the normal response (4a) of an integrator in the vertical circuit of a conventional video tape recorder to a normal composite video signal and the response (4b) to a video signal encoded according to the present invention;

FIGS. 5a and 5b are photographic reproductions of waveforms showing exemplary displacements introduced into the vertical interval for encoding according to the present invention;

FIG. 6 is a block diagram of an exemplary encoder according to the present invention;

FIG. 7 is a schematic diagram of the encoder of FIG. 6; and

FIGS. 8a through 8e are photographic reproductions of waveforms which illustrate the operation of the encoder of FIGS. 6 and 7.

Figure 1A:
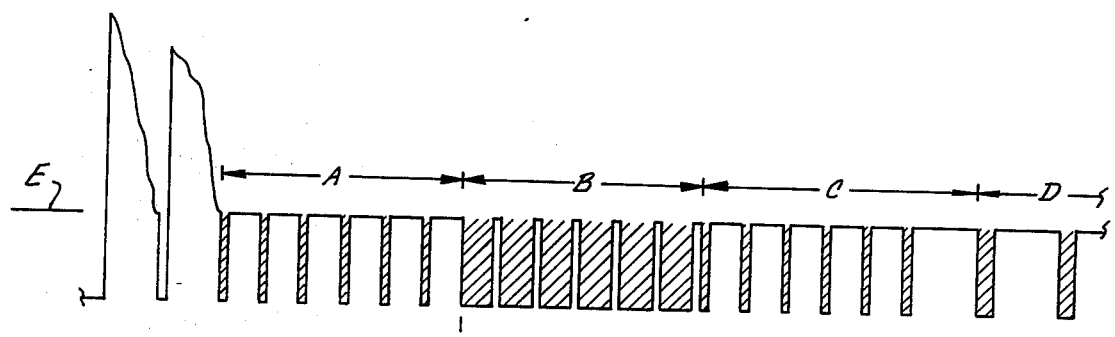
FIGS. 1a through 1d are representations of waveforms of standard and encoded video signals.

Turning now to the drawings, and first to FIG. 1, FIG. 1a is a diagrammatic representation of a conventional NTSC composite video signal waveform. The vertical interval includes a first equalizing pulse interval A, a vertical synchronizing pulse interval B, a second equalizing pulse interval C, and horizontal blanking pulses D. A horizontal pulse at the end of each line causes the beam of the cathode ray tube to be brought back to the left-hand side, in position for the next line. The vertical pulses at the end of each field, are responsible for bringing the beam back to the top of the image. Thus, a vertical sync signal occurs at the end of every 262½ lines under United States standards, while a horizontal pulse occurs at the end of each line.

As is known, the equalizing pulse intervals A and C each comprise a series of six equalizing pulses inserted into the signal immediately before and after the vertical sync pulses or serrates B so that the vertical pulse oscillator receives the necessary triggering voltage at the same time after every picture field to obviate the effect of the halfline difference from one field to the next. The separation of the vertical and horizontal pulses from each other is based on their frequency (or waveform) difference and not on their amplitude since the amplitude is the same for both as can be seen from FIG. 1a. Each horizontal pulse is much shorter in duration than the vertical sync pulse, rising and falling very rapidly (e.g., five microseconds). As also is known, a lowpass filter will develop the vertical pulse voltage at its output, while a high-pass filter will develop only the horizontal pulse voltage at its output. These two distinct pulses can then be fed to their respective oscillators, controlling them in accordance with the dictates of the signal being received. Thus, the filters separate the vertical and horizontal pulses from each other, and then modify their form slightly so that they are suitable for controlling the frequency of the horizontal and vertical oscillators. Horizontal synchronization is maintained during the presence of the vertical synchronizing pulse interval B by serrations that break up the vertical synchronizing pulse into six "blocks" or pulses as shown in FIG. 1a. These serrations have twice the line frequency, and are so timed that the fall of every other serration occurs at the instant the horizontal synchronizing pulse, if present, would have fallen in amplitude. The groups A and C of six equalizing pulses just before and after the vertical pulses B are introduced in place of three horizontal synchronizing pulses, and these equalizing pulses have twice the repetition frequency of the horizontal synchronizing pulses, and are half as long. The equalizing pulses provide brief time intervals just before and just after the vertical synchronizing pulses B that are identical for both fields of the interlaced scanning pattern.

Figure 1B:
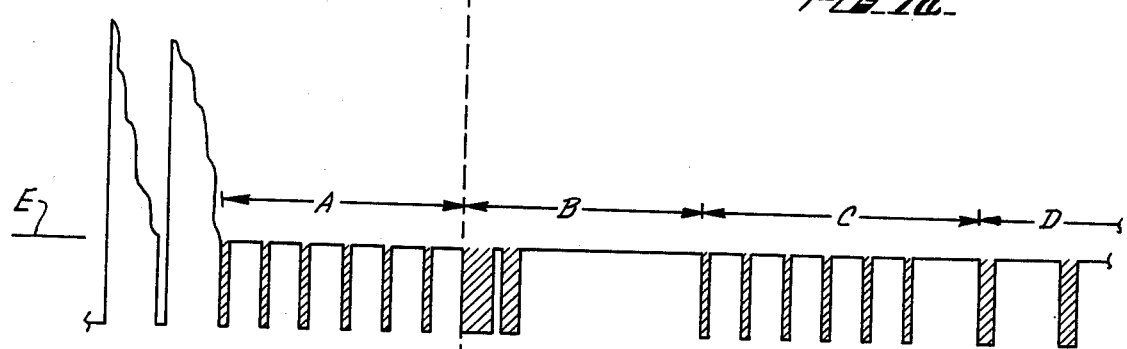

The waveform of FIG. 1b illustrates the concept of the present encoding process, wherein the first and approximately half of the second vertical pulses or serrates of the sync interval B are retained in a standard form and the remainder of the second and third through sixth serrations are eliminated. Additional serrations or pulses also can be eliminated. Although this approach is workable in allowing a television receiver to properly reproduce a picture and will prevent some conventional video tape recorders from properly re-recording, the same substantially deviates from the standard composite video signal because of the elimination of pulses or serrates.

Figure 1C:
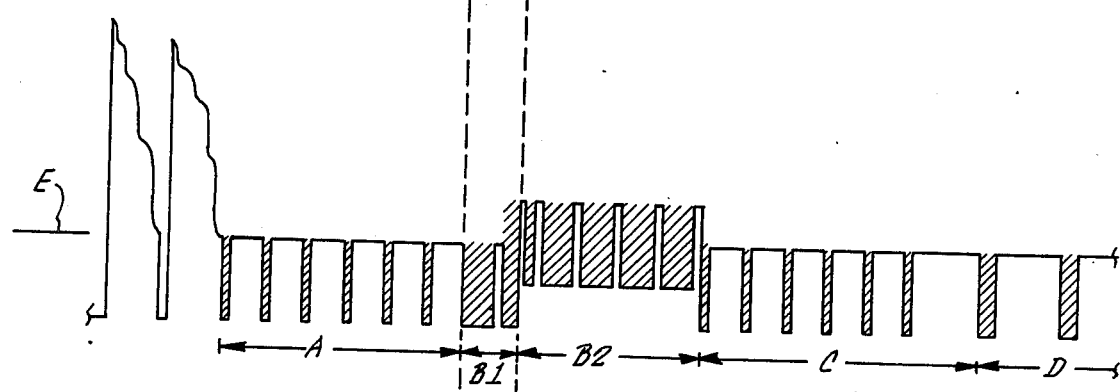

A preferred approach over that shown in FIG. 1b is illustrated in FIG. 1c wherein a similar result is achieved, but all of the serrates of the vertical sync pulse interval are retained so that the interval is maintained close to standard. In this instance, a portion B1 of the first part of the vertical sync pulse interval is retained in a normal fashion, and the remaining portion B2 of the vertical sync pulse interval B is displaced upwardly from the blanking level E which is a system reference level. An exemplary displacement is approximately fifty percent with respect to the blanking level E, and this displacement, in turn, causes the serrates in the interval portion B2 to swing plus and minus with respect to the blanking level. This results in the integrator of the vertical circuit of a video tape recorder not charging sufficiently to produce a control pulse which, in turn, normally would cause the recording of a control track on the tape copy. Although this occurs in the video tape recorder circuit, the serrates (approximately one and one half serrates) at the beginning of the vertical sync pulse interval are sufficient to cause the integrator in the vertical circuit of a normal conventional television receiver or monitor to lock onto the vertical sync of the video signal. Thus, even though a receiver needs at least a portion of the vertical sync pulse interval, it is not as dependent thereon for proper synchronization within the receiver as are many video tape recorders. An exemplary video recorder with which the encoding of FIG. 1c (and FIG. 1b; see also FIG. 5a) is useful is a Sony U-Matic video cassette recorder. An attempt to record a composite video signal of the nature of that shown in FIg. 1c results in the video information being recorded (as well as the audio information), but a control track, which is derived from the vertical interval in the composite video signal, is not recorded because the vertical integrator of this recorder does not charge sufficiently to result in recording of a control track. Upon replay of the copy tape, or re-recording, on this type of machine, the video will not be displayed because of a muting circuit included therein which causes the screen to go blank or black when the control track is not present on the tape being replayed.

Figure 1D:
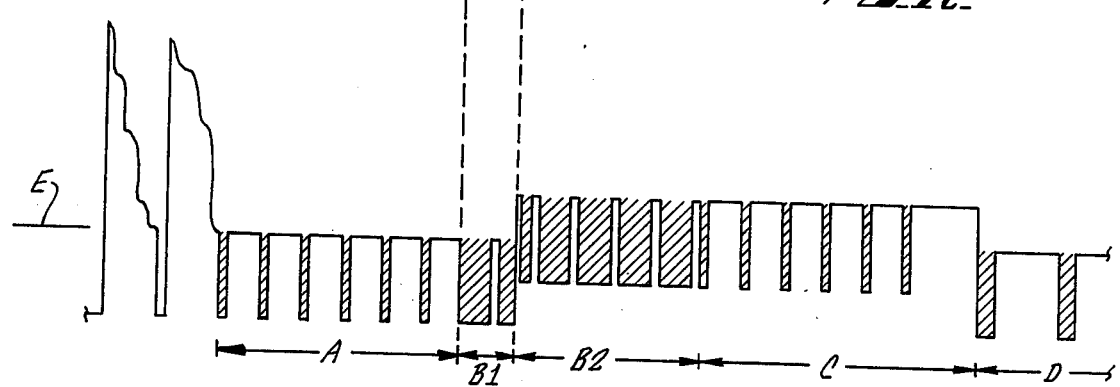

Other video tape recorders have somewhat different circuits or circuit constants, and they may record a type of control track that is sufficient to enable an acceptable picture to be reproduced from a recording of the composite video as shown in FIG. 1c. Examples are JVC and Panasonic home-type video cassette recorders and some reel to reel video recorders. In order to cause sufficient distortion upon playback of the copy tape which has been recorded on these types of machines, additional displacement (or elimination) of serrates or pulses in the vertical interval is introduced as shown in FIG. 1d according to the present invention. In the exemplary waveform of FIG. 1d (see also FIG. 5b), displacement is introduced into the remaining portion B2 of the vertical sync pulse interval B, and into the entire second equalizing pulse interval C, and possibly into one or two of the horizontal blanking pulses of interval D (a displacement extending after the last equalizing pulse is shown in FIG. 1d).

In addition to failure to produce a control track, in the record mode of many video tape recorders a second function of the control pulse, or vertical drive, derived from the vertical sync interval is to supply a drum braking current. The function of this current is to correct drum rotational variations to attain video record head switching stability. Such switching ideally should occur in the beginning of the vertical blanking period. Absence of the desired servo control results in the appearance of head switching which appears as a discontinuity, a horizontal slash or bar. This bar rolls up through the display picture since it lacks a locking reference to the vertical period.

It, therefore, will be apparent that the encoding method of the present invention involves a change in the vertical interval, and more particularly a change following the first portion of the vertical sync pulse interval, to allow sufficient pulse information for operation of a normal television receiver or monitor, but insufficient information for operation of vertical circuits of various types of video type recorders. The preferred change is a level shift so that all serrates exist in the vertical interval to thereby minimize alteration or change from the standard composite video signal, but any other change which allows proper receiver operation while preventing proper integration of the serrates in the recorder for control track generation can be used. The encoding method is applicable to various forms of audiovisual material wherein an optical to electrical transformation to a storage medium is made which subsequently is transferred to an optical display.

In referring to home television receivers and/or conventional television receivers herein, it is intended to refer to the usual types of television receivers presently available on the market and used in the home and for other applications, and whose vertical circuits can properly respond and lock with the first portion (e.g., approximately the first 1 ½ pulses or serrates) of the standard vertical sync pulse interval of a composite video signal, either broadcast over the air or by wire, or transmitted by wire or cable from a video tape recording. The same is intended with respect to the use of the term television monitor, examples of such monitors being the Conrac, Sony and Panasonic monitors currently used in many video signals monitoring applications. The references herein to video tape recorder, video cassette recorder, conventional video tape recorder, and the like, are intended to mean typically those low-cost video type recorders available for home, industrial, educational, institution, and similar uses, as well as other types of video recorders, which have a vertical circuit including an integrator or the like with a time constant which will not properly respond if only a first portion of a standard vertical sync pulse interval is available (e.g., require more than approximately the first one and a half pulses or serrates of the vertical sync pulse interval, and in some cases require some or all of the second vertical equalizing pulse interval) for providing necessary synchronizing information to enable stable recording or replay (e.g., control track and/or rotating head synchronizing or timing pulses).

Figure 2:
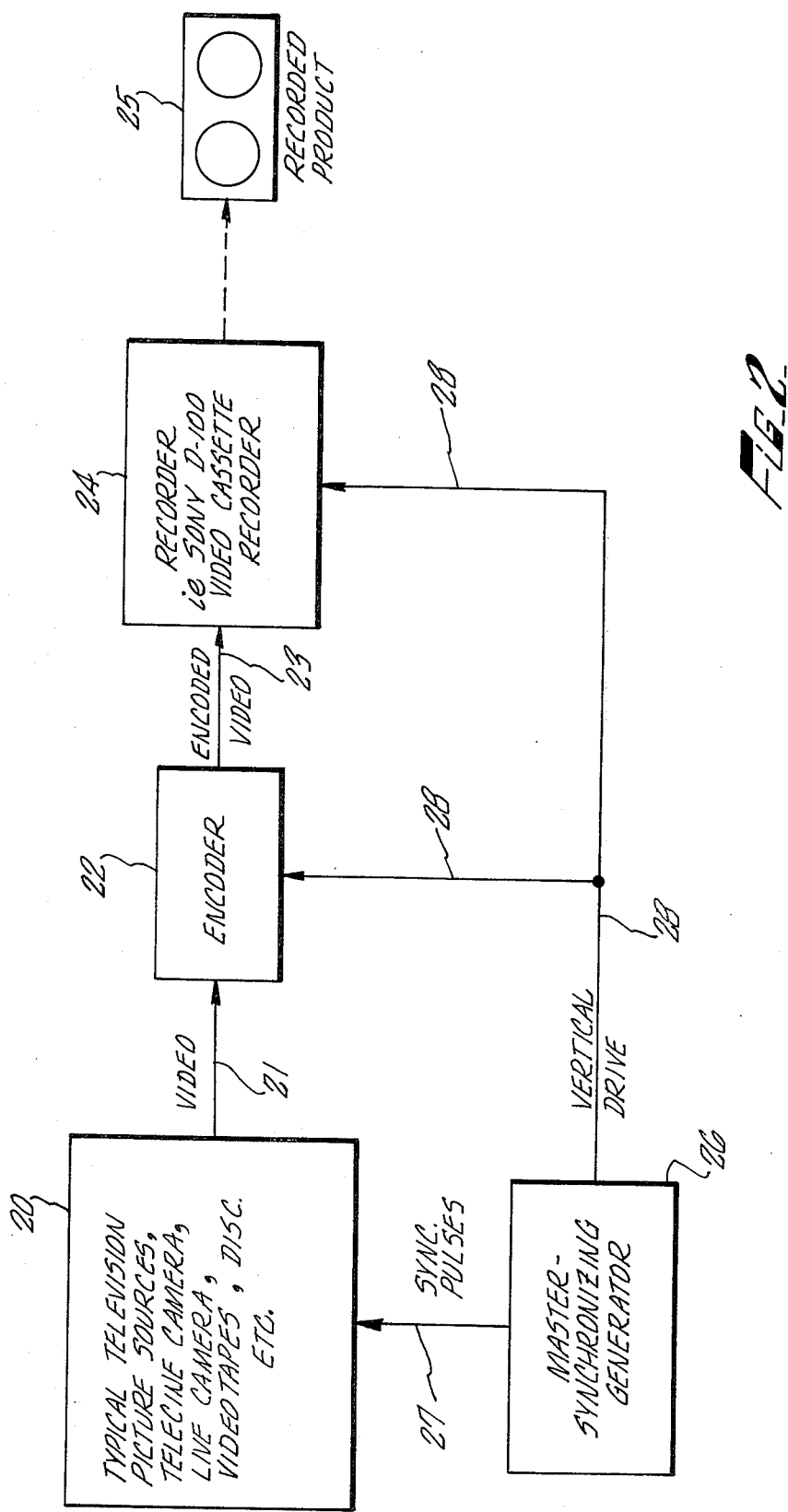
FIG. 2 is a block diagram of a recording system for recording video program material and encoding the same in accordance with the teachings of the present invention.

Turning now to FIG. 2, the same illustrates in block diagram form a system for encoding composite video signals and producing a recording of video program material which is encoded in a manner previously described. FIG. 2 shows a video program material source 20 which generates an NTSC video signal and can include any of various sources, such as a telecine camera, live camera, video tape or video disc playback machine, and so forth. The video signal is supplied by a coaxial cable 21, and any conventional video distribution amplifier, to an encoder 22 constructed in accordance with the teachings of the present invention. The encoder 22 processes the composite video signal by encoding it in the manner previously described, such as in the manner shown in FIGS. 1c or 1d. The encoded video is supplied by a coaxial cable 23 to a conventional video recorder 24. Usually, a relatively high quality recorder is used, although this is not necessary. An exemplary recorder is a Sony D-100 video casssette recorder which records on video cassettes 25, which cassettes may, in turn, be distributed through usual channels for sale, lease and ultimate reproduction of the program material. FIG. 2 also shows a master synchronizing generator 26 for synchronizing the operation of the system; that is, it provides proper timing relationships to the respective units. The generator 26, thus, provides sync pulses through line 27 to the source 20, and provides similar sync signals in the form of vertical drive signals on line 28 to the encoder 22 and to the recorder 24. The source 20, recorder 24 and generator 26 of the system shown in FIG. 22 are conventional in construction and operation. The modification of this conventional system involves the introduction of the encoder 22 between the source 20 and the recorder 24.

In the recording of the encoded video program material by the system of FIG. 2, the recorder 24 records on the cassette 25 the composite video with the encoding in the vertical interval as described previously. In the conventional recorder 24, the composite video is recorded on the tape of a video tape cassette in a helical fashion, and the audio and control track are recorded as separate tracks on the tape. The control track is developed from the vertical drive signal supplied by cable 28. The resulting recorded video cassette then can be replayed as previously described by a video cassette player on a normal television receiver or monitor. However, if the video cassette is attempted to be re-recorded or duplicated on any of numerous conventional low-price video recorders, the resulting copy when replayed through a television receiver will result in the picture going blank or black (if copied and copy replayed on a Sony U-Matic video cassette recorder) of have substantial distortion in the picture (e.g., if the copy is made and replayed on a JVC or Panasonic video cassette recorder). FIGS. 1c and 5a and 1d and 5b illustrate exemplary encoding waveforms for causing these respective results.

The encoded cassette 25 can be replayed normally and properly because the recorded composite video signal is applied from the video playback unit to the television receiver circuitry and this video signal is sufficient to allow the program material to be reproduced normally by the receiver for the reasons previously discussed. The audio from the video cassette provides proper sound from the t.v. receiver, and the control track of the video cassette provides signals which properly servo the playback of the cassette with the rotation of the playback head of the playback machine; that is, the playback head of the playback machine is properly locked with the control track signal so that the video program material is properly reproduced on the cathode ray tube.

FIGS. 3a through 3c illustrate various methods by which recording of video program material has been accomplished in the past, and thus illustrate possible methods of unauthorized duplication of video program material. FIG. 3a illustrates tape to tape re-recording wherein a video tape playback machine 30 is connected by a suitable cable or cables to a video recorder 31 for producing a copy on the blank tape of the recorder 31 from the tape being played back on the playback machine 30. FIG. 3b illustrates a typical CATV or closed circuit t.v. system wherein program material is transmitted from a source 32 through a coaxial cable 33 to a number of receivers each of which includes an RF tuner and demodulator 34 for supplying audio and video to the recorder 31. The program material from the unit 34 is coupled by a suitable cable or cables to the video tape recorder 31 for providing a copy on the tape of the recorder 31 of the program material from the source 32. In a similar manner, FIG. 3c illustrates a conventional broadcast system wherein a television station 35 transmits video signals from a transmitting antenna 36, and the video signals are passed by receiving antennae 37 to television receivers 38. A receiver 38 is connected by a cable or cables with the video tape recorder 31.

Although the encoded video material, be it video tape or broadcast, will replay with no noticeable picture degradation on the t.v. receiver, this material will not be properly recorded by any of the recording methods in FIGS. 3a through 3c when typical conventional low-cost video cassette recorders are used (such as the Sony, JVC and Panasonic units noted earlier). In attempting to record with this type of recorder 31, the video information, namely the program material, will be recorded as will be the encoded signals and other horizontal and synchronizing signals as helical tracks. Likewise, the audio will be recorded as a separate track by recorder 31. However, these types of recorders 31 also rely upon a recorded control track for proper playback. The control track is derived from the vertical interval of the composite video signal, but because of the modification of the vertical interval as described previously (e.g., note FIGS. 1b, 1c and 1d, and FIGS. 5a and 5b) the integrator in the vertical circuitry of the recorder 31 does not provide a proper pulse which, in turn, controls the production of the control track signal for recording. Therefore, no control track, or no proper control track, is recorded by the recorder 31 on the tape. The Sony U-Matic video cassette recorder Model VO1600, for example, has a vertical integrator with an integration network including resistors and capacitors and does not integrate or charge sufficiently to provide an output integrated signal. This output signal normally is supplied to trigger a multivibrator, and if this multivibrator does not receive a sufficient signal from the integrator, the same does not, in turn, function to produce the control track signal for the record head of the recorder and, thus, a control track is not recorded. In this regard, reference may be made to FIGS. 4a and 4b. The lower waveform in FIG. 4a shows a normal vertical interval of a composite video signal, and the upper waveform of this Figure depicts the charge curve of the integrator of a Sony videocassette recorder Model VO1600. When the integrator charges sufficiently, it triggers a multivibrator in the manner and for the purposes noted above (for the schematic diagrams of the Sony recorder, reference may be made to the 1972 Sony Service Manual for this Model). On the other hand, the lower waveform in FIG. 4b shows an encoded vertical interval of the nature of that shown in FIG. 1c, and the upper waveform in FIG. 4b shows the lack of proper charging of the recorder integrator circuit. Thus, no integrator signal is produced for triggering the multivibrator.

The resulting tape copy thus has recorded thereon the encoded composite video signal and an audio track, but without a proper control track. When this tape is attempted to be played back on a similar machine, the video and audio are present but, because of the lack of the control track, synchronization is lost. In the Sony U-Matic machine, a muting circuit is used which causes the picture to go black or blank when the control track is missing and, thus, no picture is displayed, although the video program material is present.

Other recorders of this nature do not include the muting circuit (e.g., JVC and Panasonic) and although the picture does not go black or blank, the same will exhibit major distortion as a result of an appropriate encoded signal, thereby making replay of the copied tape virtually useless. In the case of these recorders, the change in the vertical interval is inserted for a longer period as shown in FIGS. 1d and 5b (for the portion B2 of the vertical sync interval and for all of the second vertical equalizing pulse interval C). Results of integration similar to those shown in the upper waveforms of FIGS. 4a 4b have been observed, for example, in the response of the circuit of a Panasonic Model NV 2120 video cassette recorder to encoded video signals as shown in FIGS. 1d and 5b. With this encoding (FIGS. 1d and 5b) insufficient charge time is provided for this recorder, and no control pulse is produced from which the control track is derived and recorded. As a result, this recorder has exhibited a highly unstable picture display upon replay of a copy tape, with vertical instability and tracking loss, and with head switching rolling through the picture.

As is known, the control track signal is needed for proper synchronization of the recorder upon playback, and without this proper synchronization the picture, uncontrolled receiver are displayed, will roll and/or tear. The absence of the control track essentially results in the playback head and transport system being free-running, Resulting in inconntrolled playback with instability, tracking loss and picture disruption or distortion (to the extent that the picture is displayed rather than muted). On the other hand, the vertical circuits of a normal television received or monitor and more tolerant, and the integrator circuit thereof can charge sufficiently on approximately the first one and a half serrates of the vertical sync pulse interval, thereby providing proper synchronization and proper display of the program material.

It should be appreciated that variations can be made within the concepts of the present invention in the amount of the vertical interval which remains undisturbed and the amount that is charged, consistent with the objective of obtaining proper receiver and monitor operation on the one hand, and improper recorder operation on the other. Depending on the type of recorder that may be used in attempting to copy an original tape, either the entire remainder, or an appropriate part thereof, of the vertical sync pulse interval as shown in FIG. 1c and FIG. 5a, or this in addition to the second equalizing pulse interval as shown in FIG. 1d and FIG. 5b, as well as one or two of the horizontal blanking pulses, can be displaced or eliminated, again consistent with the objectives of proper receiver and monitor operation on the one hand and improper recorder operation on the other. Although not intending to be limited thereby, it appears that the optimum process and system involves the retention of the first one and a half vertical serrates of the vertical sync pulse interval. This amount of the vertical sync pulse interval generally is needed for proper operation of a t.v. receiver or monitor; whereas, this amount of this interval generally is not sufficient for proper operation of the recorder. From the standpoint of proper receiver operation, the more of the second sync serrate that is retained the better, consistent with preventing proper integration operation of a recorder (if approximately the first half of the second sync serrate is not retained, the picture on the receiver may roll). The change in the vertical interval is accomplished by adding a change or displacement commencing after the first portion B1 of the vertical sync pulse interval B. As shown in FIGS. 1c and 1d, and also in FIG. 4b and FIGS. 5a and 5b, a step or bias preferably is inserted to displace the negative going base of the vertical sync pulse interval midway between the blanking level and tip of sync, commencing at approximately the second half of the second serrate of the vertical sync pulse interval as shown in these Figures. This places the positive going pulses of the vertical group, now on this step, at a level about fifty percent above the blanking level E and they thus swing plus and minus with respect to the blanking level E which is the system ground reference. These alternating pulses are not effectively integrated by the recorder integrator. The level shift of 50 percent above level E is desirable, and less upward displacement from the blanking level E is less effective, but a twenty percent tolerance still is effective.

As will appear from the description of FIGS. 6 and 7, the system may include provision for selecting the length of the displacing step to achieve either the encoding as diagrammatically illustrated in FIG. 1c (and shown in the photo of FIG. 5a) or as in FIG. 1d (and shown in the photo of FIG. 5b). That is, displacement of the second half of the second serrate and the third through sixth serrates as shown in FIG. 1c can be used, or displacement of these as well as the following six serrates or pulses of the equalizing pulse interval C of FIG. 1d, and even one or two of the horizontal blanking pulses in the interval D. FIGS. 5a and 5b are photographic reproductions of these respective types of waveforms.

Turning now to FIG. 6, the same illustrates a block diagram of the encoder 22 of FIG. 2. Like reference numerals are used in FIG. 6 where appropriate, and it will be seen that a video input terminal is provided which corresponds with the composite video signal path 21 of FIG. 2. Thus, the path or cable 21 provides composite video signals from the video source to a pulse insertion mixer and video output circuit 40. This circuit functions to add a displacement or step to the vertical interval at the appropriate point therein, and the output of this circuit is supplied by path or cable 23 to a video output terminal which, in turn, is connected with a video recorder, such as recorder 24 of FIG. 2.

The encoder circuit of FIG. 6 also receives vertical drive signals via path or cable 28. These signals are applied to a vertical drive input amplifier 42 which amplifies the vertical drive and supplies the amplified signal by a line 43 to a monostable multivibrator 44. The amplified vertical drive signals or pulses drive the multivibrator 44 which, in turn, provides an output pulse on a line 45 to a pulse isolation and shaper amplifier 46. The output pulse of the multivibrator 44 is shaped by the amplifier 46. The output of the amplifier 46 is supplied by line 47 to a pulse width and shaper amplifier 48, the output of which is supplied by a line 49 to a pulse amplifier and output circuit 50. Further shaping is performed in amplifier 48, and further amplification is provided in the output circuit 50, the output of which is driven into saturation (as will be further explained in connection with a description of the circuit diagram of FIG. 7) to provide as an output a squared pulse which is applied by a line 51 to the circuit 40 and mixed with the composite video signal, and specifically in the vertical interval thereof, by the circuit 40 to produce the encoded output on cable 23.

Figure 8A:
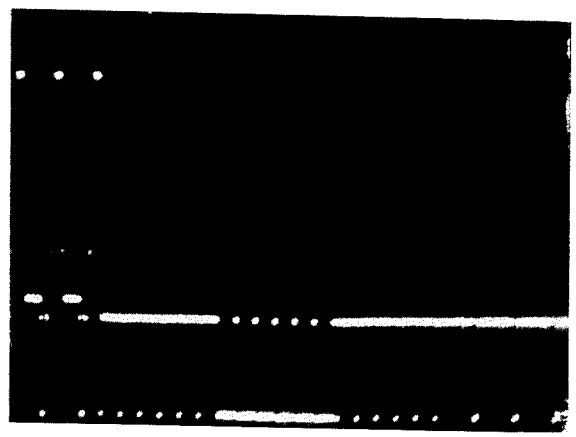

FIG. 7 is a detailed schematic diagram of the encoder which is shown in block diagram form in FIG. 6. FIGS. 8a through 8e illustrate various of the waveforms which exist throughout the circuit of FIG. 7. FIG. 8a shows the composite NTSC video waveform applied at 21 to the input of the pulse insertion mixer and video circuit 40. In the system illustrated, a step is inserted (see lower waveform of FIG. 8e) into the vertical interval at a point located 1 and ½ serrates into the vertical sync pulse interval (note the first portion of this interval B1 in FIGS. 1c and 1d) to displace the negative going serrates in a manner to cause the base of this pulse train to occur midway between blanking the tip of sync. This is accomplished by additive mixing in the mixer portion of the circuit 40 at summing junction 52. The diode circuit 53 and 54 causes only the positive excursion of the step to be applied to the junction 52. The amplitude, pulse width and position of this step can be set as will be explained subsequently. The encoded signal then is passed through transistor emitter followers 55 and 56 to the video output line 23. A resistor 57 and diode 58 provide dc restoration. A variable resistor 60 is provided between supply line 61 and the base of transistor 55 to trim the base voltage thereof, to thereby set the operating linearity of transistor 55 to maintain linear signal transfer through this transistor. A switch 66 is provided at the control input line 51 of the circuit 40 to allow encoding of the composite video signal when this switch 66 is in the "on" position, or to allow recording without encoding when this switch is in the "off" position.

Figure 8B:
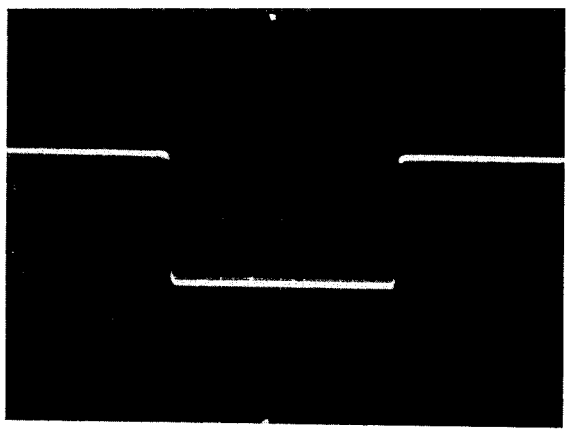

The master synchronizing generator 26 of FIG. 2 is connected to the input 28 of the encoder shown in FIG. 7 and, thus, provides an input vertical drive signal to the amplifier 42. This vertical drive signal is shown in FIG. 8b, and the same is amplified by the amplifier 42, the output of which is applied by line 43 to drive the multivibrator 44. The vertical drive signal can be derived from the composite video signal, if desired, to simplify system timing and to increase the flexibility of use of the encoder. The output of the multivibrator on its output line 45 is shown as the upper waveform in FIG. 8c. This pulse is shaped through a resistor 70 and diode 71 at the input of the pulse shaping amplifier 46, and the resulting pulse at the base of transistor 72 is shown as the lower waveform in FIG. 8c. Further shaping is accomplished in circuit 46, and the pulse at its output line 47 is shown as the upper waveform in FIG. 8d. A potentiometer 76 is provided at the input of pulse width and shaper amplifier 48 to allow adjustment of the position of the output pulse of the pulse amplifier and output circuit 50 with respect to the first several serrates of the vertical sync interval (e.g., to cause this pulse to occur at the middle of the second serrate). The movable arm of this potentiometer 76 is connected to the base of a transistor 77, the collector of which is connected through capacitors 78 and 79 to the base of a transistor 80 in the input stage of the circuit 50. The capacitor 79 is selectively connectable in parallel with the capacitor 78 by means of a switch 82. This switch allows the width of the output pulse (the step pulse, see lower waveform in FIG. 8e) from output circuit 50 to be adjusted as desired; for example to encode as shown in FIGS. 1c and 5a or to encode as shown in FIGS. 1d and 5b. With the capacitor 79 disconnected from the circuit, the step is inserted only into the vertical sync pulse interval in the manner illustrated in FIG. 1c and in FIG. 5a. With the capacitor 79 connected in parallel with the capacitor 78 by means of the switch 82, the step is inserted into the second equalizing pulse interval C also as shown in FIG. 1d and FIG. 5b, and the circuit can be changed to allow this to extend into one or two of the horizontal blanking pulses.

The output of the pulse width and shaper amplifier 48 is the upper waveform in FIG. 8e, and is applied as an input to the transistor 80 of the pulse amp and output circuit 50. The transistor 80 amplifies the input pulse to, in turn, drive an output transistor 86 into saturation, thereby forming an output squared pulse which is derived from a potentiometer 87 of the circuit 50. This output squared pulse, which appears on output line 51, is illustrated as the lower waveform in FIG. 8e. The potentiometer 87 allows the pulse height of the output pulse to be adjusted, such as to cause the positive going serrates of the vertical group to be displaced at a level of preferably 50 percent with respect to the normal as shown in FIGS. 1c and 1d, and also as seen in FIGS. 5a and 5b. The circuit shown in the lower portion of FIG. 7 is an exemplary power supply for the encoder circuit.

It should be appreciated that the concepts of the present invention can be useful with video signals other than the NTSC format, and may be applicable to video signals according to industrial standards, PAL, SECAM, and the like. In such instances, the encoding method of the present invention still involves a change in the vertical interval following the first portion of the vertical sync interval to allow sufficient pulse information for operation of a normal television receiver or monitor, but insufficient information for operation of vertical circuits of various types of video tape recorders.

What is claimed is:

1. A method of encoding video signals in a manner to allow display of video picture information on a television receiver or monitor and to hamper playback thereof from a video tape made therefrom on a video tape recorder, comprising the steps of generating a composite video signal train from a video information source, said composite video signal train comprising video picture information and a vertical interval, the vertical interval including in time a first equalizing pulse interval, a vertical sync pulse interval, a second equalizing pulse interval, and horizontal pulses, and encoding the vertical interval of said composite video signal train by changing at least a portion of said vertical sync pulse interval after approximately the first one and one half pulses of said vertical sync pulse interval, said change being insufficient to prevent display upon receipt of the resulting encoded composite video signal train by a television receiver or monitor, but being sufficient to prevent normal operation of vertical circuit means of a video tape recorder to thereby hamper proper recording by said recorder on tape of necessary synchronizing information for proper playback of the tape.

2. A method as in claim 1 wherein the step of changing at least a portion of said vertical sync pulse interval comprises eliminating the remaining pulses of said vertical sync pulse interval.

3. A method as in claim 1 wherein the step of changing at least a portion of said vertical sync pulse interval comprises eliminating the remaining pulses of said vertical sync pulse interval and the pulses of said second equalizing pulse interval.

4. A method as in claim 1 wherein said step of changing at least a portion of said vertical sync pulse interval comprises the step of displacing the remainder of said vertical sync pulse interval.

5. A method as in claim 4 wherein said encoding step additionally includes
displacing at least a portion of said second equalizing pulse interval.

6. A method as in claim 1 wherein said step of changing at least a portion of said vertical sync pulse interval comprises the step of
displacing the remainder of said vertical sync pulse interval and said second equalizing pulse interval.

7. A method as in claim 1 wherein said encoding step comprises
encoding the vertical interval of said composite video signal train by applying a displacement to the portion of said vertical sync pulse interval after approximately the first one and one half pulses thereof and applying a displacement to at least a portion of said second equalizing pulse interval.

8. A method as in claim 1 including the additional step of
transmitting said encoded composite video signal train.

9. A method as in claim 1 including the additional step of
recording on tape said encoded composite video signal train and synchronizing signals synchronized with said composite video signal train for enabling display of video picture information therefrom by a video tape playback machine and television receiver or monitor.

10. A method of encoding video signals for hampering piracy of video program material comprising the steps of
generating a composite video signal train from a video information source, said composite video signal train being of NTSC format and comprising video picture information and a vertical interval, the vertical interval including in time a first equalizing pulse interval, a vertical sync pulse interval, a second equalizing pulse interval, and horizontal pulses, and
encoding the vertical interval of said composite video signal train after a first portion of the vertical sync pulse interval by changing at least a second portion of said vertical sync pulse interval, the change being insufficient to prevent display of the resulting encoded composite video signal train by a television receiver or monitor, but being sufficient to prevent normal operation of vertical circuit means of a video tape recorder to thereby hamper proper re-recording by said recorder on tape of synchronizing information necessary for proper playback of the tape.

11. A method as in claim 10 wherein
said first portion of the vertical sync pulse interval comprises approximately the first 1½ pulses thereof.

12. A method as in claim 11 wherein
said second portion of said vertical sync pulse interval comprises the remainder thereof.

13. A method as in claim 10 wherein
said change comprises eliminating the second portion of said vertical sync pulse interval.

14. A method as in claim 10 wherein
said change comprises displacing the second portion of said vertical sync pulse interval.

15. A method as in claim 14 wherein
said change additionally comprises displacing the second equalizing pulse interval.

16. A method of encoding video signals in a manner to allow display of video picture information on a television receiver or monitor and to hamper playback thereof from a video tape reproduction made on a video tape recorder, comprising the steps of
generating a composite video signal train from a video information source, said composite video signal train being of NTSC format and comprising video picture information and a vertical interval, the vertical interval including in time a first equalizing pulse interval, a vertical sync pulse interval, a second equalizing pulse interval, and horizontal pulses, and
encoding the vertical interval of said composite video signal train by changing the level of at least a portion of said vertical sync pulse interval after approximately the first one and one half pulses of said vertical sync pulse interval, said change being insufficient to prevent display upon receipt of the resulting encoded composite video signal train by a television receiver or monitor, but being sufficient to prevent normal operation of a vertical integrator of a video tape recorder to thereby hamper proper recording by said recorder on tape of control track synchronizing information for proper playback of the tape.

17. A method of encoding and recording video signals in a manner to allow display of video picture information on a conventional television receiver or monitor without requiring special decoding thereof and to hamper playback thereof from a video tape reproduction made on a video tape recorder from the recording, and wherein the video signals to be encoded include a composite video signal train of NTSC format comprising video picture information and a vertical interval, the vertical interval including in time a first equalizing pulse interval, a vertical sync pulse interval, a second equalizing pulse interval, and horizontal pulses, the steps comprising
generating a composite video signal train from a video information source,
encoding the vertical interval of said composite video signal train by displacing at least a portion of said vertical sync pulse interval after approximately the first one and one half pulses of said vertical sync pulse interval, the displacement being approximately thirty to seventy percent from the normal NTSC format and being insufficient to prevent display of the recording of the resulting encoded composite video signal train by a conventional television receiver or monitor, but being sufficient to prevent normal operation of the vertical integrator of a conventional video tape recorder to thereby hamper re-recording or copying by said recorder on tape of necessary synchronizing information used for proper playback of the tape, and
recording said encoded composite video signal train and synchronizing signals synchronized with said composite video signal train for enabling display of video picture information therefrom by a video tape playback machine and a conventional television receiver or monitor.

18. A method as in claim 17 wherein said encoding step comprises
encoding the vertical interval of said composite video signal train by displacing all of said portion of said vertical sync pulse interval after approximately the first one and one half pulses thereof and displacing at least a portion of said second equalizing pulse interval.

19. A system for encoding video signals in a manner to hamper recording of synchronizing information for proper replay of a re-recording of said video signals, while enabling display of video picture information resulting from said video signals on a television receiver or monitor, comprising
- means for generating a composite video signal train from a video information source, said composite video signal train comprising video picture information and a vertical interval, the vertical interval including in time a first equalizing pulse interval, a vertical sync pulse interval, a second equalizing pulse interval, and horizontal pulses, and
- encoder means for receiving the composite video signal and for encoding the vertical interval thereof by changing at least a portion of said vertical sync pulse interval after approximately the first one and one half pulses of said vertical sync pulse interval, said change being insufficient to prevent display upon receipt of the resulting encoded composite video signal train by a television receiver or monitor, but being sufficient to prevent normal operation of vertical circuit means of a video tape recorder to thereby hamper proper recording by said recorder on tape of synchronizing information necessary for proper playback of the tape.

20. A system as in claim 19 including
- video tape recorder means connected to said encoder means for receiving and recording on tape the encoded composite video signal train from the encoder means, and
- synchronizing means connected with said generating means, said encoder means and said recorder means for enabling said recorder means to record on tape, in addition to said encoded composite video signal train, synchronizing signals synchronized with the video signal train for enabling display of video picture information therefrom by a video tape playback machine and a conventional television receiver or monitor.

21. A system for encoding video signals in a manner to hamper recording of synchronizing information for proper replay of a re-recording of said video signals, while enabling display of video picture information resulting from said video signals on a television receover or monitor, comprising
- source means for generating a composite video signal train from a video information source, said composite video signal train comprising video picture information and a vertical interval, the vertical interval including in time a first equalizing pulse interval, a vertical sync pulse interval, a second equalizing pulse interval, and horizontal pulses,
- encoder means coupled with said source means for receiving the composite video signal and for encoding the vertical interval thereof by displacing the remainder of said vertical sync pulse interval after approximately the first one and one half pulses of said vertical sync pulse interval, said displacing of the remainder of the vertical sync pulse interval being insufficient to prevent display upon receipt of the resulting encoded composite video signal train by a television receiver or monitor, but being sufficient to prevent normal operation of vertical circuit means of a video tape recorder to thereby hamper proper recording by said recorder on tape of synchronizing information necessary for proper playback of the tape,
- video tape recorder means connected to said encoder means for receiving and recording on tape the encoded composite video signal train from the encoder means, and
- synchronizing means connected with said source means, said encoder means and said recorder means for synchronizing operation thereof and for providing a vertical drive signal for enabling said recorder means to record on tape synchronizing signals synchronized with he video signal train, in addition to said encoded composite video signal train, for enabling display of video picture information therefrom by a video tape playback machine and a conventional television receiver or monitor.

22. A system as in claim 21 wherein said encoder means comprises
- mixer means coupled between said source means and said video tape recorder means for mixing a displacing control signal in the vertical interval of said composite video signal,
- vertical drive input means coupled with said synchronizing means for receiving the vertical drive signal therefrom and for providing an output signal,
- multivibrator means connected to receive the output of the vertical drive input means and for providing an output pulse waveform which is a function of the vertical drive signal from said synchronizing means,
- pulse shaping means connected to receive the output of said multivibrator means for shaping said output pulse and for providing an output pulse of selectable width, and
- pulse output means connected to receive said output pulse of said pulse shaper means, and having an output coupled with said mixer means for supplying said displacing control signal to said mixer means.

23. A method of encoding video signals in a manner to allow display of video picture information on a television receiver or monitor and to hamper playback thereof from a video tape made therefrom on a video tape recorder, comprising the steps of
- generating a video information signal train from a video information source, said video information signal train comprising video picture information and synchronizing information, the synchronizing information including a vertical sync interval, and
- encoding the synchronizing information of said video information signal train after a first portion of the vertical sync interval by changing at least a second portion of said vertical sync interval, the change being insufficient to prevent display of the resulting encoded video information signal train by a television receiver or monitor, but being sufficient to prevent normal operation of vertical circuit means of a video tape recorder to thereby hamper proper recording by said recorder on tape of synchronizing information necessary for proper playback of the tape.

* * * * *